United States Patent [19]

Rowe

[11] 4,055,022

[45] Oct. 25, 1977

[54] PLANTER

[76] Inventor: Sylvester J. Rowe, 1505 N. Pulaski, Chicago, Ill. 60651

[21] Appl. No.: 703,521

[22] Filed: July 8, 1976

[51] Int. Cl.² .............................................. A01G 38/00
[52] U.S. Cl. ........................................................ 47/79
[58] Field of Search .................. 47/39, 66, 64, 70, 79, 47/80, 81

[56] References Cited

U.S. PATENT DOCUMENTS

| 129,451 | 7/1872 | Baldwin | 47/79 |
| 473,756 | 4/1892 | Jones | 47/79 |
| 754,248 | 3/1904 | Simpson | 47/79 |
| 1,272,713 | 7/1918 | Reily | 47/79 |
| 1,743,987 | 1/1930 | Tinaglia | 47/66 |
| 1,810,236 | 6/1931 | Bender | 47/79 |
| 2,220,497 | 11/1940 | Robinson | 47/64 |
| 2,249,197 | 7/1941 | Brundin | 47/79 |
| 3,137,096 | 6/1964 | Hopkins | 47/79 |
| 3,193,970 | 7/1965 | Green | 47/80 |
| 3,222,819 | 12/1965 | Marcan | 47/81 |
| 3,262,665 | 7/1966 | Black | 47/39 |
| 3,552,058 | 1/1971 | Fici | 47/79 |

Primary Examiner—Clifford D. Crowder
Assistant Examiner—James R. Feyrer
Attorney, Agent, or Firm—Peck & Peck

[57] ABSTRACT

A planter having a body portion provided with an absorbent medium in the bottom thereof. The planter being open at its upper end and an annular cap-like element being provided for releasable attachment to the upper end of the planter. The body portion of the planter having a water intake opening in the circumferential wall thereof. The water intake opening being disposed therein at a distance from the bottom of the planter on the order of 1¼ inches. A water overflow opening in the body portion of the planter in a horizontal plane below the water intake opening and diametrically disposed relative thereto. The overflow opening being above the top surface of the absorbent medium. It is desirable, when watering the potting soil in the planter, to have the planter tilted towards the overflow opening, it is also desirable to have the overflow opening at the center of the tilting axis and means is provided which ensure that the overflow opening is at the center line of the tilting axis.

3 Claims, 4 Drawing Figures

PLANTER

BACKGROUND OF THE INVENTION

The present invention relates generally to a planter in which plants are grown and more particularly is concerned with an ingenious watering system involving particularly disposed water inlets and outlets and also to a system of manipulting the planter in a certain manner when the potting soil therein is being watered.

SUMMARY OF THE INVENTION

The planter of this invention has been designed to provide a unique watering system which facilitates and speeds up the watering operation thereof.

It is also one of the features of this invention to provide an arrangement whereby the possibility of the water splashing out of the planter or container is practically eliminated.

It has been one of my prime purposes in the development of this planter to provide a water intake opening therein which is disposed in particular relationship with respect to the water outlet or overflow opening. As will become aparent as this description proceeds, this relative positioning of water intake an overflow openings indicates clearly and surely to the individual watering the planter when the potting soil within the planter has been sufficiently watered.

A further advantageous characteristic of my invention resides in a two part arrangement so that when the growing plant has reached a proper stage of growth, the planter may be used as a hanging planter, means being provided in the nature of a handle whereby the planter may be suspended by a hook or the like.

A novel system has been evolved for so positioning the planter during the watering process that this process will be speeded up as well as functioning to ensure proper watering of the potting soil as well as ensuring against over watering. This watering system and the desirable results which flow therefrom is enhanced by supporting and adjusting means for the planter and provides a highly effective apparatus when combined with the planter during the watering operation.

Additional objects and advantages of the present invention will become more readily apparent to those skilled in the art when the following general statements and descriptions are read in the light of the appended drawings.

DESCRIPTION OF THE PREFERRED EMBODIMENT

Figure 1:
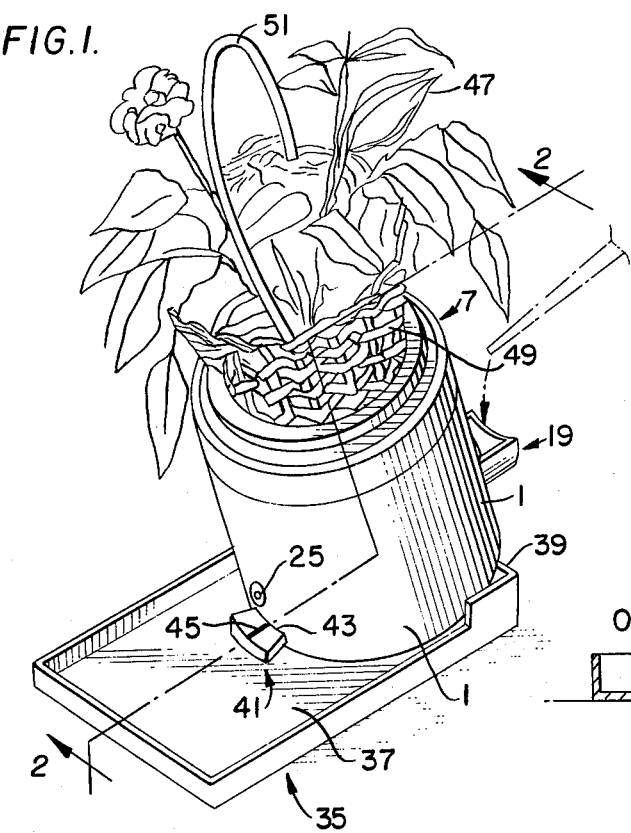
FIG. 1 is a perspective view of the planter being tilted during the watering operation, and also illustrates the means which are employed to cause tilting of the planter and to ensure that the water overflow opening is at the center of the tilting axis of the planter.

Referring to the accompanying drawings wherein, I have used the numeral 1 to designate the body portion of the planter, in the example shown in the drawings, the body portion 1 is of circumferential configuration, however, it is within my contemplation to form this body portion in any desirable shape other than circumferential. The body portion 1 is provided with a solid bottom 3 and an open upper end 5. An annulus or cap designated generally by the numeral 7 is provided for threaded removal of this cap from the upper end of the body portion 1. The cap 7 is provided with an inwardly extending flange 9 and a depending internally threaded skirt 11 which is adapted to mesh with threads 13 which are provided on the upper end of the body portion 1. Thus, it will be apparent that the cap 7 is removably attached to the upper end of the body portion 1 and that the inwardly extending flange 9 of the cap 7 reduces somewhat the diameter of the opening 5 in the upper end of the body portion 1.

Removably disposed in the bottom of the body portion is an absorbent medium 15 which may be formed of any suitable material which will absorb water when the plant in the planter is being watered.

Disposed in the circumferential wall of the body portion 1 of the planter is a water intake hole or opening 17 which, as will be apparent from the drawings, extends completely through this circumferential wall. Extending radially outwardly from and below the water intake opening 17 is a trough, drip pan or the like, designated in its entirety by the numeral 19 and this drip pan comprises a bottom 21 fixed to and extending radially outwardly below the opening 17, and further comprises a curved upwardly extending portion 23. It will be apparent that this drip pan functions as an aid in the flow of water through the intake 17 and also prevents water drippage. The water intake opening 17 is preferably, though not necessarily, formed in the circumferential wall of the planter a distance on the order of 1¼ inches above the bottom 3 of the body portion.

A water overflow opening 25 is provided in the circumferential wall of the body portion 1 of the planter and this overflow opening is positioned in the side wall diameterically opposite the intake opening 17 but in a horizontal plane substantially below the horizontal plane of the water intake opening 19. As will be apparent from consideration of the drawing, and particularly FIGS. 2 and 3 thereof, the water overflow opening 25 is formed in the circumferential wall at a point above but closely adjacent to the upper surface 17 of the absorbent medium 15.

The body portion 1 of the planter is filled with any suitable potting soil 29, the plant 31 being embedded therein so that the roots 33 thereof may be properly embedded and established in the soil. It will, of course, be recognized that when the soil and the plant are disposed within the planter, the cap 7 is removed from the planter until the plant has grown to extend through the opening 5, as is especially illustrated in FIG. 2.

When it is desired to plant a plant within the planter the cap 7 is unthreaded and removed from the body portion and the planter is positioned on a solid surface in normal or upright position, whereupon the absorbent medium, or water retainer 15, is removed and is soaked with water. It is desirable not to squeeze out the water from the absorbent medium but let the heavy drip run off. The wet absorbent medium is then put back into the bottom of the body portion 1 as clearly illustrated in the drawings. The potting soil 29 is disposed in the body portion and the plant is then placed in the soil in a routine manner.

When the planting operation is finished as just described the tilting means comes into play for causing the planter to tilt during the watering operation to achieve the highly advantageous purposes mentioned above.

I have provided means for causing the planter to tilt during the watering operation in order to speed up the watering operation and to ensure proper watering of the potting soil. It is to be appreciated that the success of my planter does not entirely depend upon the tilting thereof during the watering operation so that it is within the spirit and scope of this invention to water even though the planter is in normal upright position.

I have designated the plant tilting means in its entirety by the numeral 35. The tilting means comprises a preferably rectangular tray 37 having at one end thereof an upstanding edge or shoulder 39 which provides a tilting support for the planter during the watering operation. Spaced from the upstanding edge or shoulder 39 a distance somewhat less than the diameter of the body portion 1 of the planter and fixed in any suitable manner to the bottom of the tray 37 is a stop or positioning element designated generally by the numeral 41. The planter facing edge 43 of the stop or positioning element 41 is of arcuate shape to receive the similar curvature of the body portion 1 as will be explained. On the upper surface of the stop or positioning element is a transversely extending line or indicia 45. This indicia may be stamped on the element 41, a rib or any sort of visual indication may be used for properly positioning the planter in its tilted position for watering.

Figure 2:
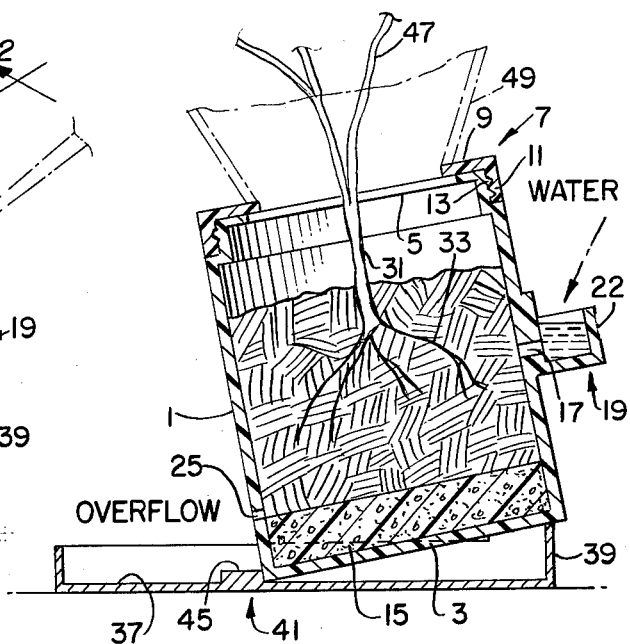
FIG. 2 is a view taken on the line 2—2 of FIG. 1.
Figure 3:
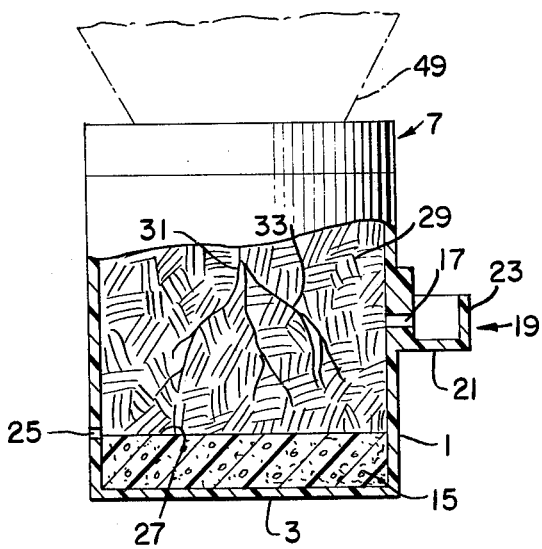
FIG. 3 is a view in elevation, with parts thereof broken away, of the planter in normal upright position.
Figure 4:
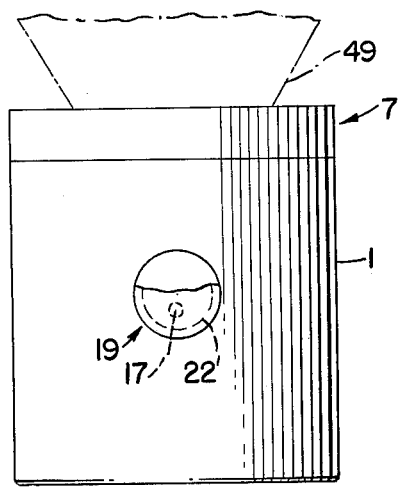
FIG. 4 is a view in elevation of the planter particularly illustrating the water intake opening therein.

When it is desired to cause tilting of the planter in the watering operation, the plant tilting means 35 is brought into play and the planter is positioned thereon and therein as particularly illustrated in FIGS. 1 and 2. The bottom 3 of the body portion is positioned on the upstanding shoulder 39 as illustrated in FIG. 2, the planter being so positioned on this shoulder that the water inlet structure 19 is in a plane substantially above this shoulder 39, while the diametrically disposed water overflow opening 25 is above and adjacent to the stop and positioning element 41. It is important for a variety of reasons that the water overflow opening 25 be in line with and directly above the positioning indicia line 45. It will be appreciated that with the water overflow opening 25 lined up with the indicia 45 that the water overflow opening will be at the center of the tilting axis of the planter. This ensures proper watering as well as overflow from the opening 25 when the soil has been watered sufficiently and prevents overwatering.

When the plant has been established and has grown to sufficient height as at 47 so that it extends upwardly through the opening 25 in the body portion, the annulus or cap 7 may be threaded on the top of the body portion. I preferably affix to the top of cap 7 a decorative arrangement such as the basket simulating member 49 and to this decorative arrangement 49 is affixed a curved handle 51 so that the planter may be used as a hanging basket suspended from a hook or the like.

It is to be distinctly understood that this decorative arrangement 49 need not be in the form of a basket simulating means but may take many forms, and may, if desired, be eliminated in which event the handle 51 would be directly affixed to the cap 7.

It will be evident that the planter arrangement which I have devised ensures against overwatering which, as is well known, is undesirable in this discipline. This planter is so constructed that sufficient moisture is applied thereto in the watering operation. It is also well known that water will follow a course of least resistance and these courses are enlarged with every watering so that it becomes a series of pipe lines from the soil surface to the overflow or tray, which causes flushing out soil or plant food. After a series of waterings the water runs from the surface to the overflow so rapidly that it fails to achieve its purpose of creating moisture in the soil.

It also should be thoroughly understood that watering from the side of the body portion of the planter functions to substantially prevent root washout as the water flows down the inside wall of the planter until it contacts the sponge and then crosses over to the opposite side of the planter whereupon the rising water will reach the overflow opening and trickle through, indicating that sufficient water has been applied to the planter in a particular watering. It will be clear that the soil in the planter draws moisture from the sponge to all areas within the planter and to the soil surface and as the sponge looses some moisture in this manner it draws additional moisture from the bottom 3 of the planter.

It will be clear that in the watering operation the trough like member 19 is filled with water which trickles through the water intake opening 17 and the filling of the trough like member is continued until water trickles out the overflow opening 25.

The plant tilting means 35 may be formed of any desirable and suitable inexpensive material.

What is claimed is:

1. Means to support a planter in a tilted position during the watering thereof, said means being independent of the planter during the watering operation, including in combination, a planter having a bottom and an upstanding wall fixed thereto, and structure provided on said means to support and raise a portion of the bottom and upstanding wall of the planter during the watering operation, a portion of the bottom of said planter adjacent the edge thereof being supported in raised position on said structure, the opposite portion of the bottom of said planter resting on said means in position spaced from said structure and in a horizontal plane below said portion of the bottom of the planter which is supported on said structure, and said planter having a water intake opening in the raised portion of the upstanding wall of said planter and a water outlet opening in the opposite upstanding wall portion of said planter, said water outlet opening being oppositely disposed relative to said water inlet opening and being in a horizontal plane below the water inlet opening.

2. Means to support a planter in tilted position during the watering thereof, said means being independent of the planter during the watering operation, including in combination, a planter having a bottom and an upstanding wall fixed thereto, and a structure provided on said means to support and raise a portion of the bottom and upstanding wall of the planter during the watering operation, a portion of the bottom of said planter adjacent the edge thereof being supported in raised position on said structure, said means including a tray, an upstanding stop affixed to said tray in position remote from said structure, the distance between said structure and said upstanding stop being less than the dimension of the bottom of the planter, the portion of the bottom and upstanding wall of the planter opposite to that portion which is supported in raised position on the structure resting on said means and against said stop respectively, the said opposite portion of the bottom of said planter being in a horizontal plane below said portion of the bottom of the planter which is supported on said structure, and said planter having a water intake opening in the raised portion of the upstanding wall of said planter and a water outlet opening in the opposite upstanding wall portion of said planter, said water outlet opening being oppositely disposed relative to said water inlet opening and being in a horizontal plane below the water inlet opening.

3. Means to support a planter in a tilted position in accordance with claim 2, wherein the stop is provided with indicia thereon extending transversely thereof and the adjacent water outlet opening is in alignment with said indicia to dispose said water outlet opening at the center of the tilting axis of the planter.

* * * * *